(12) United States Patent
Iwai et al.

(10) Patent No.: US 6,816,187 B1
(45) Date of Patent: Nov. 9, 2004

(54) CAMERA CALIBRATION APPARATUS AND METHOD, IMAGE PROCESSING APPARATUS AND METHOD, PROGRAM PROVIDING MEDIUM, AND CAMERA

(75) Inventors: Yoshiaki Iwai, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 797 days.

(21) Appl. No.: 09/587,246

(22) Filed: Jun. 2, 2000

(30) Foreign Application Priority Data

Jun. 8, 1999 (JP) .......................................... P11-161217

(51) Int. Cl.[7] .............................................. H04N 17/00
(52) U.S. Cl. ...................................... 348/187; 382/289
(58) Field of Search ................................. 348/135, 136, 348/137, 42, 43, 241, 627, 333.1, 187, 50, 189, 180, 181, 182; 382/154, 266, 268, 275, 289; 358/504, 406

(56) References Cited

U.S. PATENT DOCUMENTS 5,803,570 A * 9/1998 Chen et al. ................. 353/122
5,818,959 A * 10/1998 Webb et al. ................. 382/154
6,191,808 B1 * 2/2001 Katayama et al. ............ 348/39
6,437,823 B1 * 8/2002 Zhang ........................ 348/187

* cited by examiner

Primary Examiner—Andrew Christensen
Assistant Examiner—Heather R. Long
(74) Attorney, Agent, or Firm—Bell, Boyd & Lloyd LLC

(57) ABSTRACT

The present invention relates to a high-performance camera calibration apparatus and method capable of accomplishing stable high-accuracy parameter estimation. A pattern whose geometrical configuration is known in advance is photographed by a camera to generate a picked-up image, with the generated picked-up image being temporarily stored as an image input in a frame buffer. In addition, a base image having a pattern univocally corresponding in geometrical configuration definition to the picked-up image is generated according to the CG technology or the like, and is stored in another frame buffer. An image registration is made between the base image and the picked-up image to minimize the luminance error, which enables the parameter estimation.

41 Claims, 12 Drawing Sheets

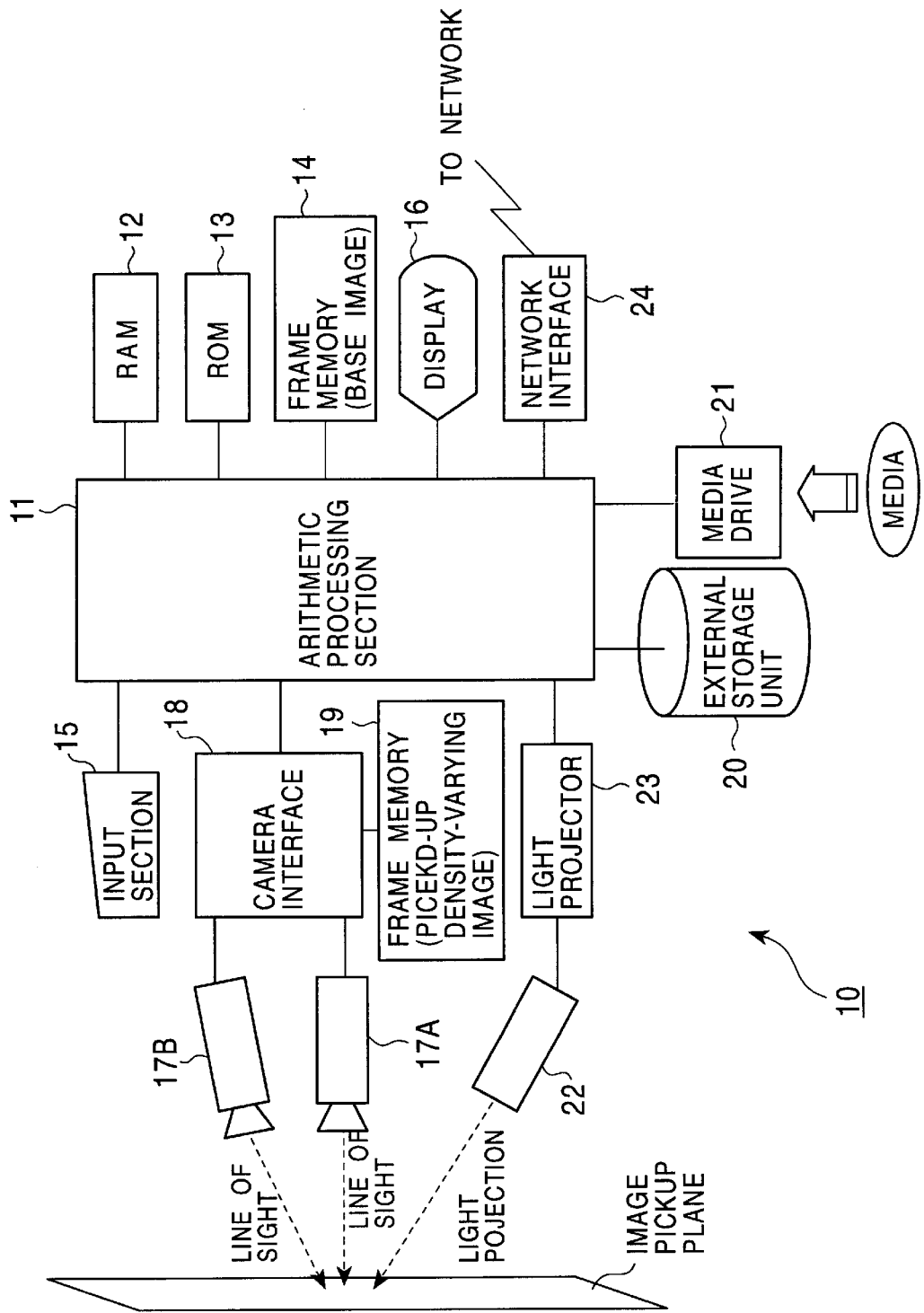

FIG. 4
$$\begin{bmatrix} x_o \\ y_o \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x_u \\ y_u \\ 1 \end{bmatrix}$$
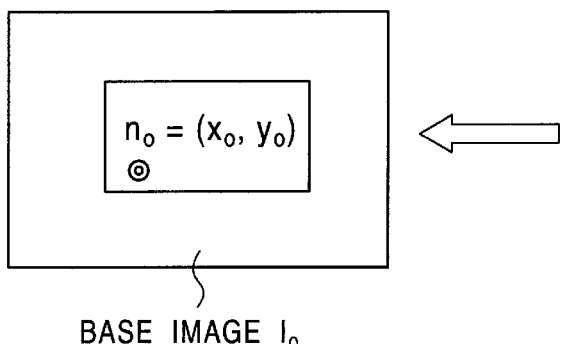
BASE IMAGE $I_o$
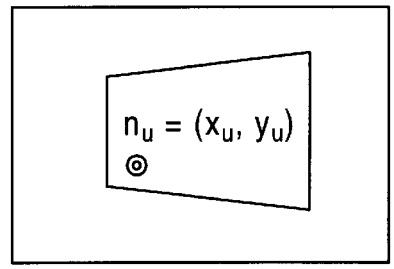
$x_u = x_d + (x_d - c_x)\kappa r_d^2$
$y_u = y_d + (y_d - c_y)\kappa r_d^2$
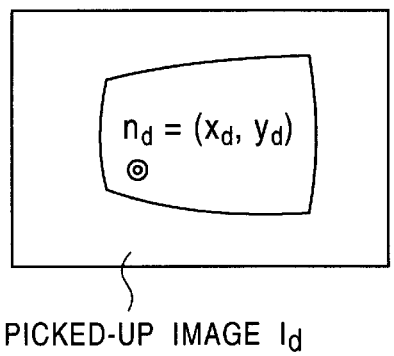
PICKED-UP IMAGE $I_d$

CAMERA CALIBRATION APPARATUS AND METHOD, IMAGE PROCESSING APPARATUS AND METHOD, PROGRAM PROVIDING MEDIUM, AND CAMERA

BACKGROUND OF THE INVENTION

1. Field of the Invention

The present invention relates to a camera calibration method and apparatus for calculating a parameter representative of a characteristic of a camera, and more particularly to a camera calibration method and apparatus for calculating a parameter of a camera which is of a type picking up an image of a subject to output electronic image data.

More concretely, the invention relates to a camera calibration method and apparatus capable of accomplishing a stable estimation of a parameter with high accuracy on the basis of one picked-up image.

2. Description of the Related Art

With the recent progress of image processing technology, general-purpose computer systems, exhibiting high-level functions and great arithmetic processing ability, have come into widespread use, for example, among research organizations, enterprise offices and general homes. In addition, the computer application field has enlarged, and not only computer data but also other data including images and voices are translated into an electronic form computers can handle. For example, electronic image data captured through an image pickup means, such as a digital camera, and then read into a computer can diversely be processed through the use of computer resources for image combinations, image deformation and others.

Most of the existing cameras perform central projection through the use of a pinhole camera model. This central projection signifies that a color density of a point P on a surface of a three-dimensional object is put at the intersection between a straight line (also referred to as "line of sight") connecting a projection center C with the point P on the object surface and a projection screen of the camera, and is for forming a projected image. In the case of the central projection, regardless of size identification of an object, as the object approach the projection center C of the camera, larger image projection takes place. On the other hand, as it recede from the projection center C, smaller image projection occurs.

Furthermore, it is obvious from the geometric optics that an image taken (photographed) from an oblique direction with respect to the front of a subject becomes a projection image obtained by the projection conversion of an image taken from a position just facing the front thereof. The fact that the projection image is obtainable by the projection conversion of the front image according to a projective transformation matrix H has been well known in the technical field of image processing. For example, if a front image is electronic image data captured through a digital camera, when the captured front image undergoes projection conversion through the use of a computer resource, it is possible to easily calculate a projection image, equivalent to when taken from an arbitrary direction (light of sight), at a relatively high speed. For example, "Understanding of Image" 1990, written by Kenichi Kanaya and published by Morikita Shuppan, discloses that the original image is convertible into an image viewed at a different angle, through a projective transformation matrix.

The property on the geometric optics, related to the projective transformation, also applies to, for example, a method of measuring a distance from an object according to the "stereo-method". Here, the "stereo-method" signifies a method of measuring the distances between points in a scene, that is, in a picked-up image, and the projection centers through the use of images taken from a plurality of station (view) points (projection centers) having predetermined positional relation to each other according to the so-called "triangulation" principle.

In this specification, for convenience in description, the stereo-method will be conducted with two station points, that is, two cameras. One camera is used as a base camera, and is for picking up an image of a subject from a position right opposed to the front to output a base image. The other camera is a reference camera, and is for capturing an image of the subject from an oblique direction to issue a reference image. FIG. 10 illustratively shows the locations of a base camera and a reference camera with respect to a subject, and FIG. 11 illustratively shows a base image of a generally square pattern and a reference image thereof taken through the use of the base camera and the reference camera, respectively.

As FIG. 10 shows, a point P appears at the intersection $n_b$ between a straight line connecting a point P on a plane forming a subject with a projection center $C_b$ of the base camera and a projection screen $S_b$ of the base camera. The straight line for the connection between the point P and the projection center $C_b$ of the base camera is a line of sight of the base camera. Additionally, a point P appears at the intersection $n_d$ between a straight line connecting the point P with a projection center $C_d$ of the reference camera and a projection screen $S_d$ of the reference camera. The straight line for the connection between the point P and the projection center $C_d$ of the reference camera is a line of sight of the reference camera.

When undergoing a projective transformation, the line of sight of the base camera becomes the line of sight of the reference camera. The projective transformation is described with a projective transformation matrix H. The line of sight of the base camera is observed as a straight line on the projection screen of the reference camera, and this straight line is called "epipolar line".

Furthermore, as FIG. 11 shows, a picked-up image taken by the base camera right facing the generally square pattern becomes square. An image taken by the reference camera viewing this pattern from an oblique direction, by contrast, appears as a trapezoidal form because of the reduction of a side at a longer distance from the station point. This depends upon the basic characteristic of the central projection that, regardless of size identification of an object, as the object approaches the projection center C of a camera, the effect is a projection of a larger image, and as it recedes from the projection center C, the effect is a projection of a smaller image.

As mentioned above, the picked-up image $I_d$ by the reference camera equals an image resulting from the projective transformation of a picked-up image $I_b$ by the base camera. That is, the relationship between a point $n_b$ $(x_b, y_b)$ in the picked-up image $I_b$ by the base camera and the corresponding point $n_d$ $(x_d, Y_d)$ in the picked-up image $I_d$ by the reference camera is given by the following equation, where H represents a 3×3 projective transformation matrix.

[Equation 1]

$$n_d = H \cdot n_b$$

The projective transformation matrix H is a matrix tacitly containing internal parameters and external parameters of a camera and a plane equation, and has eight degrees-of-freedom because the degree of freedom stays in a scale factor. Incidentally, the "Understanding of Image" 1990, written by Kenichi Kanaya (published by Morikita Shuppan), says that the corresponding points between a base image and a reference image is obtainable through the projective transformation.

The line of sight of the base camera appears as a straight line, called the "epipolar line", on the projection screen $S_d$ of the reference camera (refer to the above description and FIG. 10). The point P existing on the line of sight of the base camera appears on the same observation point $n_b$ in the projection screen $S_b$ of the base camera, irrespective of the depth of the point P, that is, the distance thereof from the base camera. On the other hand, the observation point $n_d$ for the point P on the projection screen $S_d$ of the reference camera appears on the. epipolar line in accordance with the distance between the base camera and the point P.

FIG. 12 is an illustration of a state of the observation point $n_d$ on the projection screen $S_d$ of the reference camera. As illustrated in FIG. 12, as the position of the point P shifts from $P_1$ through $P_2$ to $P_3$, the observation point in the reference image shifts from $n_{d1}$ through $n_{d2}$ to $n_{d3}$. In other words, the position on the epipolar line corresponds to the depth of the point P.

When the observation point $n_d$ corresponding to the observation point $n_b$ of the base camera is searched on the epipolar line utilizing the above-mentioned property on the geometric optics, the identification of the distance of the point P is feasible. This is the basic principle of the "stereo-method".

However, the production of a perspective image based on a front image of a subject actually taken or the measurement of the distance to an object from a plurality of images, taken by a plurality of cameras, according to the stereo-method is on the assumption that the image pickup optical system of the camera has a property agreeing completely with the theory. Accordingly, there is a need to make a predetermined correction of an image taken actually. For example, in general, a lens of a camera has a distortion parameter(s), and an observation point appears at a position shifted from the theoretical point. Thus, not until a parameter peculiar to a camera is calculated to make a correction of image data according to the calculated parameter at the projective transformation that a precise projection image is obtainable from a front image, and that a precise depth measurement is feasible according to the stereo-method.

In addition to the lens distortion parameter, camera's parameters involve internal parameters representative of a characteristic of a camera and external parameters indicative of a three-dimensional position of the camera. A method of calculating the camera's parameters is generally called "camera Calibration". Although many ways for the camera calibration have been proposed so far, nevertheless the settled way does not exist.

The most popular camera calibration method involves taking a calibration pattern comprising a plurality of reference points, whose positions in a three-dimensional space are known in advance, to calculate simultaneously all the camera's parameters, such as internal parameters, external parameters and distortion parameters. This method is written, for example, in the Paper "An Efficient and Accurate Camera Calibration Technique for 3D Machine Vision" (1986, IEEE) presented by Roger Y. Tsai. However, the use of this method requires the preparation of a calibration pattern in which reference points are shown accurately, and further requires a mechanism for positioning the reference points precisely.

In addition, another common camera calibration is a method of picking up an image of an object (for example, a bar or a cube) having a linear configuration. This method involves extracting points on an object from an image picked up to apply to a straight line by minimizing the error of the distance to a straight line comprising that point group, thereby calculating the degree of distortion. There is a problem which arises with this method, however, in that a possible error at the extraction of the points from the picked-up image affects the linear approximation and, ultimately, the calculation of the distortion. Accordingly, for obtaining the parameters stably and accurately, there is a need to take a plurality of straight line groups having a diversity of directionality, which causes the work to become complicated and the calculation amount to increase.

Still additionally, there is a method of conducting the camera calibration through the use of images obtained by photographing common scenes. For example, this method is written in the Paper "Automatic calibration and removal of distortion from scenes of structured environment" presented by Frederic Devernay or in the Paper "Lens Distortion Calibration Using Point Correspondences" presented by G. P. Stein. However, the calibration methods written in these documents require the extraction of linear components from a picked-up image or requires the determination of corresponding points to two or more picked-up images, so the present technical level does not reach stable estimation of parameters.

Moreover, since each of the above-mentioned methods relies on the extraction of local characteristic points for the parameter calculation, the extraction error occurs naturally. In other words, for example, there is a need to pick up a plurality of images for stabilizing the parameter estimation.

SUMMARY OF THE INVENTION

Accordingly, it is an object of the present invention to provide a high-performance camera calibration apparatus and method capable of achieving stable and high-accuracy parameter estimation for a camera of the type photographing a subject and outputting the corresponding electronic image data.

Another object of the invention is to provide a high-performance camera calibration method and apparatus capable of accomplishing stable and high-accuracy parameter estimation on the basis of one picked-up image.

For these purposes, in accordance with a first aspect of the invention, there is provided a camera calibration apparatus or method for calculating a parameter representative of a characteristic of a camera, comprising an image inputting means or step of inputting a picked-up image obtained by taking a photograph of a pattern with a predefined geometrical configuration through the use of a camera, an image holding means or step of holding a base image comprising the pattern with the predefined geometrical configuration, and a transformation parameter calculating means or step of calculating a transformation parameter on the basis of the association (correspondence) in pixel between the picked-up image and the base image.

The camera calibration apparatus or method according to the first aspect of the invention further comprises an image generating means or step of generating the base image comprising the pattern with the predefined geometrical configuration according to the definition. In this case, it is also appropriate that the image holding means or step holds the image generated by the image generating means or step.

Alternatively, the camera calibration apparatus or method according to the first aspect of the invention further comprises an image generating means or step of generating the base image comprising the pattern with the predefined geometrical configuration according to the definition and a light projecting means or step of projecting the generated base image on a generally plain plane. In this case, it is also appropriate that the image inputting means or step inputs a picked-up-image obtained by photographing the projected image, given by the light projecting means or step, through the use of a camera.

In addition, in the camera calibration apparatus or method according to the first aspect of the invention, it is also appropriate that the transformation parameter calculating means or step performs an image conversion of one of the picked-up image and the base image and further associates (maps) the converted image with the other.

Still additionally, it is also appropriate that the transformation parameter calculating means or step derives a projective transformation parameter, performs an image conversion of one of the picked-up image and the base image through the use of the derived projective transformation parameter and associates the converted image with the other to minimize a luminance (brightness) error between the corresponding pixels of both the images over the whole of the images.

Moreover, it is also appropriate that the transformation parameter calculating means or step derives a distortion parameter representative of a distortion factor of the picked-up image taking place at the image pickup by the camera and performs a projective transformation of the picked-up image from which distortion is removed through the use of the distortion parameter to associate the transformed image with the base image.

Still moreover, it is also appropriate that the transformation parameter calculating means or step corrects the luminance value of the base image in accordance with the luminance value of the picked-up image. In this case, a preferred correction is possible by extracting, from the picked-up image, an area in which the luminance values are approximately equal to each other and obtains the average value of the luminance values in the extracted area to replace the luminance value of the corresponding pixel in the base image with the average value.

Furthermore, a second aspect of the invention provides an image processing apparatus or method for processing a plurality of images picked up by a camera, with the apparatus or the method comprising image inputting means or step of inputting a picked-up image obtained by taking a photograph of a pattern with a predefined geometrical configuration through the use of a camera, image holding means or step of holding a base image comprising the pattern with the predefined geometrical configuration, transformation parameter calculating means or step of calculating a transformation parameter on the basis of the association (correspondence) in pixel between the picked-up image and the base image, and arithmetic means or step of obtaining the association in pixel among a plurality of picked-up images obtained by the camera through the use of the calculated transformation parameter.

The image processing apparatus or method according to the second aspect of the invention further comprises image generating means or step of generating the base image comprising the pattern with the predefined geometrical configuration according to the definition. In this case, it is also appropriate that the image holding means or step holds the image generated by the image generating means or step.

Alternatively, the image processing apparatus or method according to the second aspect of the invention further comprises image generating means or step of generating the base image comprising the pattern with the predefined geometrical configuration according to the definition and light projecting means or step for projecting the generated base image on a generally plain plane. In this case, it is also appropriate that the image inputting means or step inputs a picked-up image obtained by photographing the projected image, given by the light projecting means or step, through the use of a camera.

In addition, in the image processing apparatus or method according to the second aspect of the invention, it is also appropriate that the transformation parameter calculating means or step performs an image conversion of one of the picked-up image and the base image and further associates the converted image with the other.

Still additionally, it is also appropriate that the transformation parameter calculating means or step derives a projective transformation parameter, performs an image conversion of one of the picked-up image and the base image through the use of the derived projective transformation parameter and associates the converted image with the other to minimize a luminance (brightness) error between the corresponding pixels of both the images over the whole of the images.

Moreover, it is also appropriate that the arithmetic means or step performs, for the association between two picked-up images obtained by the camera, a coordinate transformation using a projective transformation for associating one of the two picked-up images with the base image and an inverse transformation of a projective transformation for associating the other picked-up image with the base image. In this case, the transformation parameter calculating means or step derives a distortion parameter representative of a distortion factor of the picked-up images taking place at the image pickup by the camera and performs a projective transformation of the picked-up image from which distortion is removed through the use of the distortion parameter to associate the transformed image with the base image.

Still moreover, it is also appropriate that the transformation parameter calculating means or step corrects the luminance value of the base image in accordance with the luminance values of the picked-up images. In this case, a preferred correction is possible by extracting, from the picked-up images, an area in which the luminance values are approximately equal to each other and obtains the average value of the luminance values in the extracted area to replace the luminance value of the corresponding pixel in the base image with the average value.

Still moreover, it is also appropriate that the image inputting means or step inputs a plurality of picked-up images taken by a plurality of cameras standing in a predetermined positional relationship.

Furthermore, a third aspect of the invention provides a computer-readable program providing medium for providing, in a material computer-readable form, a computer program for implementing, on a computer system, a camera calibration to calculate a parameter representative of a characteristic of a camera, with the computer program comprising an image inputting step of inputting a picked-up image obtained by taking a photograph of a pattern with a predefined geometrical configuration through the use of a camera, an image holding step of holding a base image comprising the pattern with the predefined geometrical configuration, and a transformation parameter calculating step of calculating a transformation parameter on the basis of the association (correspondence) in pixel between the picked-up image and the base image.

Still furthermore, a fourth aspect of the invention provides a camera capable of conducting a camera calibration, comprising image inputting means for inputting a picked-up image, image holding means for holding a base image comprising a pattern with a predefined geometrical configuration, and transformation parameter calculating means for calculating a transformation parameter on the basis of the association (correspondence) in pixel between the picked-up image, which has a pattern with the predefined geometrical configuration, inputted through the image inputting means and the base image.

According to the invention, the camera parameter calculation, i.e., the calibration, is made by the image registration between a picked-up image taken actually through a camera and a base image composed (or combined) in a computer.

The picked-up image for use in the calibration is inputted by taking a photograph of a calibration pattern whose geometrical configuration is known in advance, with the inputted picked-up image being stored temporarily, for example, in a frame buffer existing in the interior of a camera calibration apparatus.

Meanwhile, the base image having a pattern univocally corresponding in the definition of the geometrical configuration to the calibration pattern is retained in another frame buffer of the camera calibration apparatus. The camera calibration apparatus also can accept an arrangement in which a base image including a pattern created in advance is put in an external a storage device such as a hard disk and, when needed, is fetched from this disk to be written in a frame buffer.

Alternatively, it is also appropriate that, in the interior of the camera calibration apparatus, a base image is generated on the basis of the definition of a geometrical configuration according to a computer graphic technology, and is stored temporarily in a frame buffer. In brief, the base image written in the frame buffer has a complete pattern conform to the theoretical geometrical configuration.

The picked-up image, i.e., the pattern to be taken actually through a camera, is not required to be a pattern formed permanently on a plane by printing, but it is also acceptable if that pattern is developed by projecting a base image, generated with the computer graphics, on a plane by means of a light projecting means (for example, a slide). In this case, it is relatively easy to maintain the univocal or unique property in geometrical configuration of a calibration pattern between the base image and the picked-up image.

The parameter calculation can be made by performing the image registration between the picked-up image and the base image thus obtained and further by reducing the luminance error to a minimum.

Thus, the camera calibration apparatus and method according to the present invention enable stable high-accuracy parameter estimation using one picked-up image.

Accordingly, although the pattern to be taken by the camera is required to be univocal with respect to the geometrical configuration definition to be used for pattern composition for the base image in the computer, no limitation is imposed on the distance to the subject or the pattern size. This is because the projective transformation can take care of the scale of the photographed pattern involved in the variation in distance and the difference in photographing direction. The projective transformation can be made relatively easy through arithmetic processing in a computer resource.

Because of conducting the processing without using local characteristic points, the invention can not only eliminate the influence on the parameter estimation from an error generated at the extraction of the characteristic points, or the like, but also restrain the influence of a noise of an image taken through a camera. Additionally, the invention can accomplish stable parameter calculation through the use of one picked-up image.

In addition, a combination of simple figures (for example, checkers with two colors of black and white or a combination of binary triangles) functions satisfactorily as a pattern to be used for the calibration,. For a photograph of such a pattern, there is a need to prepare a plane having a pattern identical to the composed pattern, but there is no need to equalize the distance to the camera or the size of the pattern; therefore, the condition on the calibration is reducible. Additionally, for the calibration, it is also possible to pick up an image obtained by projecting a pattern, projected using a slide or the like, on a plain plane.

Still additionally, since a pattern already known, that is, a pattern with a predefined geometrical configuration, is used for the calibration, it becomes easy to construct a preprocessing algorithm for luminance correction or the like. The calibration can also be designed using a pattern which enables easy construction of a preprocessing algorithm.

The camera calibration according to the invention can calculate a projective transformation matrix indicative of the correspondence between a composed image and a picked-up image simultaneously with calculating a distortion parameter, and is also applicable to a calibration for the stereo-method. That is, in a manner that a coordinate transformation is made through a projective transformation for associating one of two picked-up images by a camera(s) with a base image and an inverse transformation of a projective transformation for associating the other picked-up image with the reference image, the association between the two picked-up images is obtainable.

For example, Japanese Patent Application No. 9-207948 or 9-207951, already assigned to this applicant, discloses an image processing apparatus and method based on the stereo-method, and the invention is also applicable to these image processing apparatus and method.

A program providing medium according to the third aspect of the invention is a medium for offering, in a material computer-readable form, a computer program to, for example, general-purpose computer systems capable of implementing various program codes. This medium can be a detachable portable storage medium such as CD (Compact Disc), FD (Floppy Disc) or MO (Magneto-Optical disc), or a transmission medium such as a network, and limitation is not particularly imposed on form.

Such a program providing medium defines a cooperative relationship in structure or function between a predetermined computer program and the providing medium for realizing the function of the computer program on a computer system. In other words, a predetermined computer program is installed in a computer system through a program providing medium according to each of seventh to ninth aspects of the invention to exhibit a cooperative operation on the computer system, thereby offering the same effects as those of the first aspect of the invention.

Other object and features of the present invention will become more readily apparent from the following detailed description of the preferred embodiments taken in conjunction with the accompanying drawings.

BRIEF DESCRIPTION OF THE DRAWINGS

FIG. 1 illustratively shows a configuration of hardware of a camera calibration system according to the present invention;

FIG. 4 is an illustration of the association between a base image and a picked-up image;

DESCRIPTION OF THE PREFERRED EMBODIMENTS

Figure 2A:
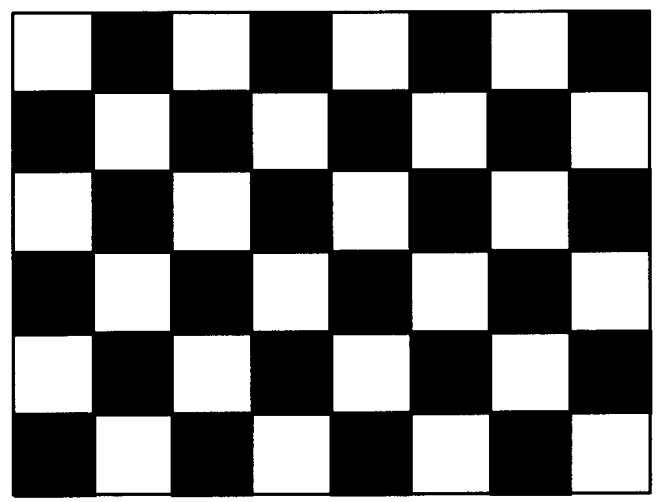
FIGS. 2A and 2B are illustrations of examples of a calibration pattern for use in the camera calibration according to the invention.

Embodiments of the present invention will be described in detail with reference to the drawings.

First of all, a description will be given hereinbelow of a configuration of a camera calibration system (image processing system) designated generally at reference numeral 10 in FIG. 1. The camera calibration system 10 is constructible as a dedicated hardware designed especially for processing of an image inputted from a camera and, alternatively, is realizable with a predetermined application program for conducting processing of a picked-up image on a general-purpose computer system.

FIG. 1 illustratively shows a hardware configuration of the camera calibration system 10. The components thereof will be described hereinbelow.

An arithmetic processing section 11 is a main controller for generally controlling the operation of the entire image processing system 10, and is constructed with a CPU (Central Processing Unit) which runs predetermined image processing. application programs. That is, the arithmetic processing section 11 is for executing various kinds of application programs under the control of an operating system (OA). For example, the arithmetic processing section 11 implements the following image processing.

(1) The arithmetic processing section 11 implements predetermined processing on computer graphics to generate a base image whose geometrical configuration comprises a predefined pattern, and puts the generated base image in a frame memory 14.

(2) The arithmetic processing section 11 calculates a transformation parameter of a camera(s) (hereinafter described) on the basis of the association in pixel between a picked-up image by the camera and the base image, and performs the image registration processing between two images at the parameter calculation.

(3) The arithmetic processing section 11 uses the calculated transformation parameter to obtain the association in pixel among a plurality of picked-up images taken by the camera. For example, it performs a distance measurement according to the stereo-method on the basis of the association between observation points of a base camera 17A and a reference camera 17B.

A RAM (Random Access Memory) 12 is a writable memory the arithmetic processing section 11 uses to load a running program code or to store operation data temporarily. For example, program codes or data needed for various kinds of arithmetic processing including camera calibration are loaded in the RAM 12. In general, the RAM 12 is constructed with a plurality of DRAM (Dynamic RAM) chips. A ROM (Read Only Memory) 13 is a non-volatile memory dedicated to readout, in which storage data are permanently written at manufacturing. For example, the ROM 13 retains a self-diagnosis test program (POST) running at the power-on for the system 10 or a group of codes (BIOS) for implementation of hardware input/output operations.

A frame memory 14 is a buffer memory for temporarily storing the base image (mentioned above) generated from the arithmetic processing section 11. Incidentally, the frame memory 14 can be independent of the RAM 12, and can be constructed as a dedicated partition in the RAM 12.

An inputting section 15 is a device for accepting a command input or the like from the user, and contains a keyboard for inputting a command on the character base and a mouse or a touch panel for inputting a command in the form of coordinate indication.

A display section 16 is a device for presenting a work screen, for example, including a menu for processing images or commands to the user, such as a CRT (Cathode Ray Tube) display or an LCD (Liquid Crystal Display).

The cameras 17A and 17B are devices each for taking a photograph of an object existing actually in a three-dimensional space to obtain it in the form of electronic image data, with they being connected through a camera interface. 18 to the system 10. The cameras 17A and 17B can be made to be attachable/detachable to/from the interface 18. In this embodiment, for the photograph of the object, the cameras 17A and 17B employ the central projection (mentioned above) according to the pinhole camera model.

The positional relationship between these two cameras 17A and 17B is fixed to organize a stereo pair. That is, one camera 17A is used as a base camera while the other camera 17B is used as a reference camera, which allows the distance measurement of an object according to the stereo-method (see the foregoing "Description of the Related Art" with respect to the principle of the stereo-method). A picked-up image from each of the cameras 17A and 17B is temporarily put in a frame memory 19. The picked-up image can be accumulated in an external storage unit 20 (hereinafter mentioned), for example, in a predetermined file format (for example, a bit-mapped format having an extension ".bmp").

In this embodiment, on a screen plane, formed is a calibration pattern having a univocal geometrical configuration definition with respect to the base image (mentioned above). Each of picked-up images obtained by taking a photograph of this calibration pattern With the cameras 17A and 17B is image-registered to the base image stored in the frame memory 14 (hereinafter mentioned).

However, the camera calibration system 10 is not always required to include two cameras for realizing the stereo-method. For example, it is also acceptable that the system 10 has only a single camera 17A to perform the calibration with the single camera 17A.

The external storage unit 20 is a relatively-large-capacity, re-writable non-volatile storage device such as a hard disk drive (HDD), and is used for accumulating data files or for installing program files. As an example of the data file, there is a geometrical configuration data file which is for generating a calibration pattern in a base image. Additionally, an example of the program file is a three-dimensional graphic application to be run in the arithmetic processing section 11 or an application for implementing camera calibration processing.

A media drive 21 is for accommodating replaceable cartridge-type media to read/write data from/on a surface of the media. In this case, the media includes portable media, such as MO (Magneto-Optical disc), CD-ROM, DVD (Digital Versatile Disc), attachable/detachable to/from the system 10. A geometrical configuration data file for defining a calibration pattern in a base image or a program file for conducting camera calibration processing or the like is delivered through such media, and is installed in the external storage unit 20 by means of the media drive 21.

A light projector 22 is a device for projecting a desired pattern on a screen plane, and is connected through a light projector interface 23 to the system 10. The light projector 22 is capable of fetching a base image, generated by the arithmetic processing section 11, from the frame memory 14 to project it on the screen plane. In this case, the projected base image itself is available as the calibration pattern to be photographed actually, which eliminates the need for the formation of a pattern on a screen by printing.

A network interface 24 is a device for connecting the camera calibration system 10 to a network according to a predetermined communication protocol (for example, TCP/IP (Transmission Control Protocol/Internet Protocol). A plurality of computer systems (hereinafter referred to as "remote systems", not shown) lie on the network. The camera calibration system 10 according to this embodiment can receive, through the use of the network, a geometrical configuration data file about a calibration pattern in a base image, a program file for camera calibration, and other files from the remote systems.

Although many hardware components other than those shown in FIG. 1 are also necessary for the actual arrangement of the camera calibration system 10, these components are well known among those skilled in the art, and do not constitute a point of the invention. Accordingly, they are omitted from this specification. Additionally, in order to avoid confusion on the illustration, the connections between the hardware blocks are shown abstractly in the illustration (for example, the CPU constituting the arithmetic processing section 11 is commonly designed to be connected through various types of input/output interfaces to peripheral devices, but not locally connected through its external pins thereto).

Secondly, a description will be given hereinbelow of calculation of a distortion parameter(s) for a single camera 17A or 17B (for convenience only, the following description will be focused on only the camera 17A.), that is, a camera calibration processing procedure. In this case, the "distortion parameter" signifies a distortion center ($c_x$, $c_y$), a coefficient $\kappa$ of distortion, and an aspect ratio (pixel aspect ratio) $S_x$. Additionally, a projective transformation matrix H describes the association between a base image $I_0$ composed by the arithmetic processing section 11 and a picked-up image $I_d$ given by the camera 17A. Although the following description of the processing procedure is based upon the transformation (conversion) from a picked-up image into a base image, the inversion transformation is also applicable to the parameter calculation in the invention.

A plane in which a pattern is formed is first photographed with the camera 17A. A density-varying image Id picked up by the camera 17A is stored temporarily in the frame memory 19. The pattern formed on the plane is a calibration pattern to be used for calibration, with its geometrical configuration being known in advance. The pattern is not required to be formed on the plane by printing, but it is also acceptable that it is formed by projecting a base image in the frame memory 14.

Figure 2B:
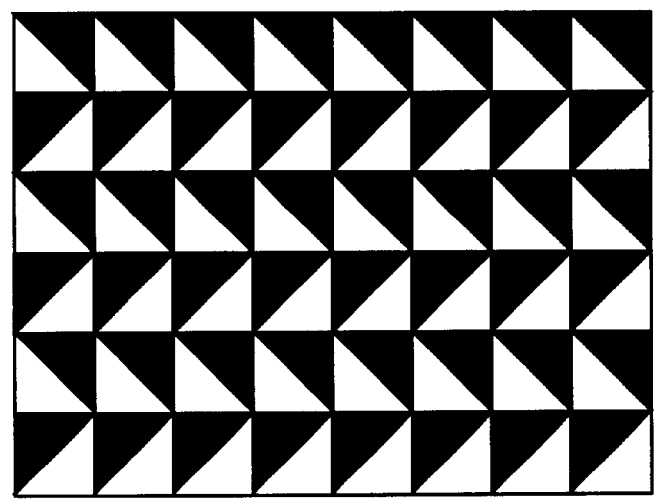

The calibration pattern is not particularly limited by its configuration, size and color as long as the geometrical configuration thereof is known in advance. Additionally, a combination of simple basic figures easy to generate in a computer (hereinafter mentioned) will do sufficiently. For example, the calibration pattern can be a binary black-and-white checker pattern or a combination of binary triangles, as shown in FIG. 2. Still additionally, a subject is required to contain a pattern univocally corresponding in geometrical configuration definition to the composed base image, but no limitation is imposed on the distance to the camera 17A or the size of the pattern.

Figure 3:
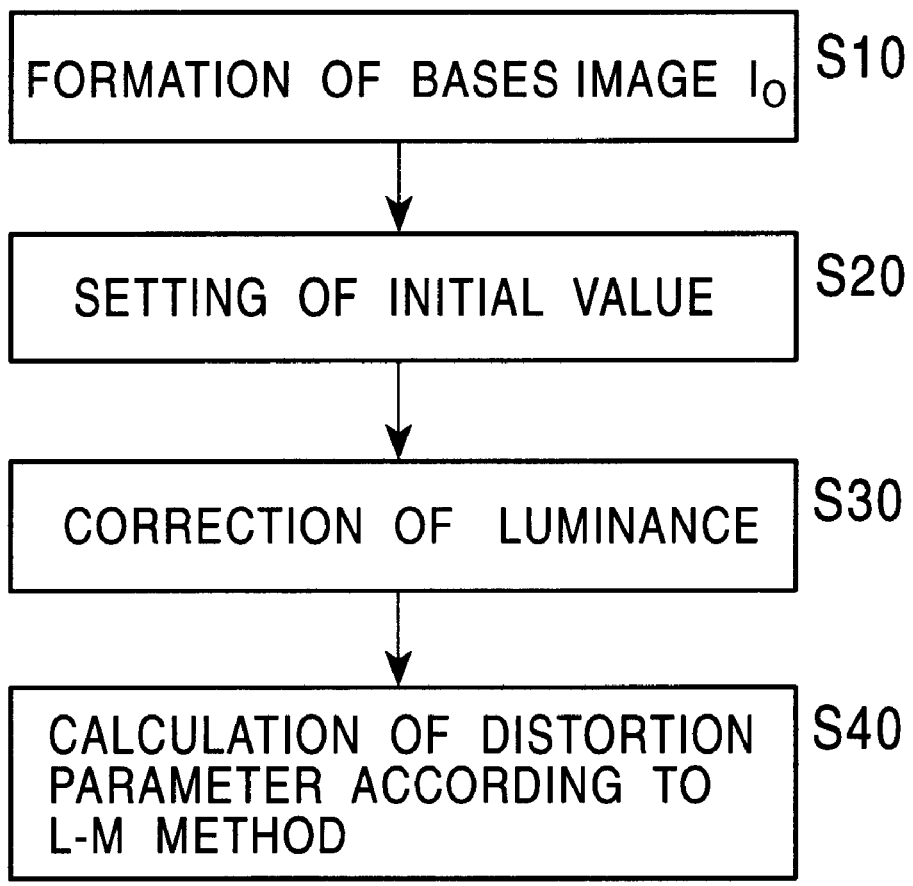
FIG. 3 is a flow chart showing the outline of a processing procedure for distortion parameter estimation.

Subsequently, a calculation of a distortion parameter is made through the use of the base image $I_0$ and the picked-up image $I_d$ stored in the frame buffers 14 and 19, respectively. FIG. 3 schematically shows this distortion parameter calculation procedure in the form of a flow chart. For example, this processing procedure is realized in a manner that the arithmetic processing section 11 implements a predetermined program code. This processing procedure will be described hereinbelow with reference to the flow chart illustrated.

First of all, the arithmetic processing section 11 composes a calibration pattern on the basis of a geometrical configuration definition in the interior of a computer to put the composed image in the frame memory 14 as a base image $I_0$ (step S10).

Subsequently, the arithmetic processing section 11 sets an initial value representative of the association between the base image $I_0$ and a picked-up image $I_d$ (step S20). This association is described with a projective transformation matrix H. However, in this step, the correspondence between the two images is only set without taking a lens,distortion of the camera 17A into consideration. Any initial value is acceptable provided that the setting of four or more corresponding points is possible, and no need for particular limitation in setting method exists.

Following this, the arithmetic processing section 11 makes a correction in luminance between the base image $I_0$ and the picked-up image $I_d$ (step S30). The base image $I_0$ composed in the computer is a complete binary image. On the other hand, the picked-up image $I_d$ obtained by actually photographing the calibration pattern (see FIG. 2) comprising a binary pattern through the use of the camera 17A generally becomes a density-varying image due to the effect of illumination conditions and others. For this reason, it is preferable that the luminance distribution of each of the picked-up image $I_d$ and the base image $I_0$ is corrected before the parameter calculation, which also contributes to high-efficiency and high-accuracy image registration (hereinafter mentioned). However, this luminance correction processing is not essential to the distortion parameter calculation. The details of the luminance correction processing will be described later.

Referring here to FIG. 4, a description will be given of the association between the base image $I_0$ composed through the calculation processing in the system 10 and the picked-up image $I_d$ given by the camera 17A. The correspondence between these two images is expressed with a projective transformation matrix H and a distortion parameter ($c_x$, $c_y$, $\kappa$, $s_x$)

When a point on a pick-up image plane based on a camera model taking into consideration a lens distortion to be used for parameter estimation is taken as $n_d = [x_d, y_d]_T$ and the corresponding point on a picked-up image plane paying no attention to the lens distortion is taken as $n_u = [x_u, y_u]^T$, the following relationship resides between the point $n_d$ and the point $n_u$.

[Equation 2]

$$x_u = x_d + (x_d - c_x)\kappa r_d^2$$
$$y_u = y_d + (y_d - c_y)\kappa r_d^2 \quad (1)$$

In the above equations, $r_d$ represents a distance from a distortion center ($c_x$, $c_y$), and is defined by the following definition.

[Equation 3]

$$r_d = \sqrt{\left(\frac{x_d - c_x}{s_x}\right)^2 + (y_d - c_y)^2} \quad (2)$$

In addition, when a point on the base image $I_0$ is taken as $n_0 = [x_0, y_0]^T$, since $n_u$ is a point on an image plane, the transformation from $n_0$ into $n_u$ is expressed as the following equation using a projective transformation matrix H.

[Equation 4]

$$\begin{bmatrix} x_o \\ y_o \\ 1 \end{bmatrix} = H \begin{bmatrix} x_u \\ y_u \\ 1 \end{bmatrix} \quad (3)$$

Since the projective transformation matrix is a 3×3 matrix, the point $n_0 = [\text{on } x_0, \text{on } y_0]^T$ on the base image $I_0$ can be expressed as follows using each coefficient $h_{ij}$ of the matrix H.

[Equation 5]

$$x_0 = \frac{h_{11}x_u + h_{12}y_u + h_{13}}{h_{31}x_u + h_{32}y_u + h_{33}} \quad (4)$$

$$y_0 = \frac{h_{21}x_u + h_{22}y_u + h_{23}}{h_{31}x_u + h_{32}y_u + h_{33}}$$

From the above equations (1) and (4), the following relationship resides between the point $n_0 = [\text{on } x_0, \text{on } y_0]^T$ on the base image $I_0$ and the point $n_d = [x_d, y_d]^T$ on the picked-up image $I_d$.

[Equation 6]

$$x_0 = \frac{h_{11}\{x_d + (x_d - c_x)\kappa r_d^2\} + h_{12}\{y_d + (y_d - c_y)\kappa r_d^2\} + h_{13}}{h_{31}\{x_d + (x_d - c_x)\kappa r_d^2\} + h_{32}\{y_d + (y_d - c_y)\kappa r_d^2\} + h_{33}} \quad (5)$$

$$y_0 = \frac{h_{21}\{x_d + (x_d - c_x)\kappa r_d^2\} + h_{22}\{y_d + (y_d - c_y)\kappa r_d^2\} + h_{23}}{h_{31}\{x_d + (x_d - c_x)\kappa r_d^2\} + h_{32}\{y_d + (y_d - c_y)\kappa r_d^2\} + h_{33}}$$

Returning again to FIG. 3, a description will be given herein$_b$ below of the procedure for the parameter calculation. As illustrated in FIG. 3, the estimation of a lens distortion parameter of the camera 17A is conducted in a step S40.

In this embodiment, the distortion parameter estimation is made according to the so-called image registration technique. In fact, the estimation of parameters [$h_{11}$, $h_{12}$, ..., $h_{32}$, $h_{33}$, $c_x$, $c_y$, $\kappa$, $s_x$] is made by minimizing the square-sum of a luminance error between the base image $I_0$ and the picked-up image $I_d$ as indicated by the following equation.

[Equation 7]

$$E = \sum_i \{I_o(x_o, y_o) - I_d(x_d, y_d)\}^2 = \sum_i e_i^2 \quad (6)$$

With respect to this minimization, the Levenberg-Marquardt minimization method (hereinafter referred to simply as "L-M method") is available. For example, the L-M method is described in "NUMERICAL RECIPES in C" (W. H. Press), written by S. A. Teukolsky, W. T. Vetterling, B. P. Flannery.

Since the degree of freedom of the projective transformation matrix is eight, of the foregoing parameters, $h_{33}$ is set as 1 and, hence, the parameter estimation is not made therefor. Accordingly, the number k of unknown parameters is k=1. Additionally, in the following description, for convenience in description, the parameters will sometimes be expressed as [$h_{11}$, $h_{12}$, ..., $h_{32}$, $h_{33}$, $c_x$, $c_y$, $\kappa$, $s_x$]=[$m_1$, $m_2$, ..., $m_{11}$, $m_{12}$].

An algorithm according to the L-M method employs the partial differential for each of the unknown parameters $m_k$. The partial differential for each unknown parameter on an error $e_i$ is given by the following equation.

[Equation 8]

$$\frac{\partial e_i}{\partial m_k} = \frac{\partial I_o}{\partial x_o} \cdot \frac{\partial x_o}{\partial m_k} + \frac{\partial I_o}{\partial y_o} \cdot \frac{\partial y_o}{\partial m_k} \quad (7)$$

In the above equation (7), ($\partial I_0/\partial x_0$, $\partial I_0/\partial y_0$) signifies a luminance gradient at a point ($x_0$, $y_0$). From the partial differential regarding the unknown parameter, the L-M method provides an approximate Hessian matrix a and a weighted gradient vector $\beta$. The components are as follows.

[Equation 9]

$$\alpha_{kl} = \sum_i \frac{\partial e_i}{\partial m_k} \cdot \frac{\partial e_i}{\partial m_l} \quad (8)$$

$$\beta_k = -2 \sum_i e_i \frac{\partial e_i}{\partial m_k}$$

In each repeating state, each of the aforesaid unknown parameters $m_k$ is updated by $\Delta m_k$.

[Equation 10]

$$\Delta m = (\alpha + \lambda I)^{-1} \beta \quad (9)$$

In this equation (9), $\lambda$ denotes a time-varying stabilization parameter. The updating in increments of $\Delta m_x$ is repeatedly made until the error $e_i$ reaches a sufficiently small value, thereby enabling the estimation of each of the unknown parameters. The actual image registration is made as follows. (Processing 1)

With respect to each pixel $n_{di} = [x_{di}, y_{di}]^T$ on the picked-up image $I_d$, the following calculations are made:

1) the calculation of the corresponding point $n_0 = [x_0, y_0]^T$ on the base image $I_0$ using the above equation (5);
2) the calculation of the luminance error $e_i$ between the corresponding pixels of the picked-up image $I_d$ and the base image $I_0$ and the luminance gradient ($\partial I_0/\partial x_0$, $\partial I_0/\partial y_0$);

3) the calculation of the partial differential on each unknown parameter $m_k$ according to the above equation (7); and
4) the calculation of $\alpha$ and $\beta$ according to the equation (8).
(Processing 2)

The system equation indicated by the above equation (9) is solved to update each unknown parameter $m_k$ by $\Delta m_k$ (where k=1, 2, ..., 12).
(Processing 3)

When the square-sum of the luminance error given by the equation (6) increases, the parameter $\lambda$ is set to ten times, then returning to the Processing 2. If no increase takes place, the parameter $\lambda$ is set to 1/10, thereafter returning to the Processing 1.

With the above-described processing, it is possible to accomplish the estimation of each of the distortion parameters. As stated above, when the luminance correction between the images $I_0$ and $I_d$ is made as the preprocessing in the step S30, effective parameter estimation becomes feasible. This is because the luminance correction is expected to avoid the luminance error convergence or the local solution at the image registration.

Figure 5:
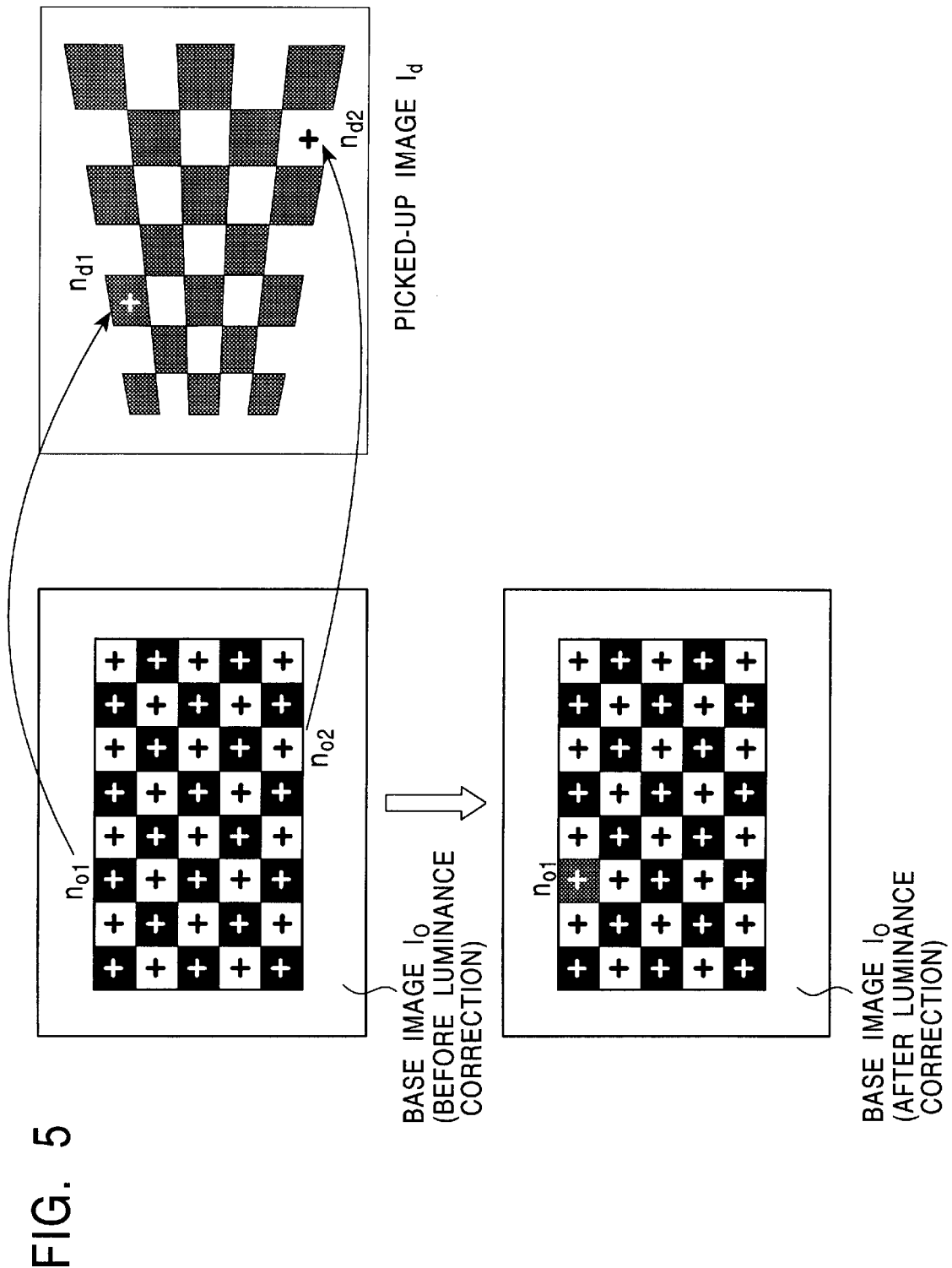
FIG. 5 is an illustration of a processing procedure for luminance correction between the base image and the picked-up image.

One example of the luminance correction method will be described hereinbelow with reference to FIG. 5. In this case, let it be assumed that a calibration pattern comprising binary black-and-while checkers is used as illustrated and four or more corresponding points are given with respect to the base image $I_0$ and the picked-up image $I_d$. Since an initial projective transformation matrix $H_0$ describing the inter-image association provides eight degrees of freedom, the calculation of all the components is possible with the four or more associations (however, in this phase, no consideration is given to the distortion parameter).

First, set is a central position of each graphic pattern of the base image $I_0$. Since a calibration pattern included in the base image $I_0$ is a pattern generated through the calculation processing in the system 10, it is seen that the use of the well-known image processing technique can realize easy setting of the central position. In FIG. 5, the center of the cross mark in each of the graphic patterns represents the set central position.

Following this, the point $n_d$ in a picked-up image corresponding to each set point $n_0$ in the base image $I_0$ is calculated using the initial projective transformation matrix $H_0$. Additionally, the luminance value of a figure in the base image $I_0$ to which the set point pertains is replaced with the luminance value of the point $n_d$. Alternatively, it is also appropriate that, instead of the simple replacement of the luminance value, also in the picked-up image $I_d$, each graphic pattern is labeled previously and the average value of the respective luminance values is put to use.

Although the above description relates to the distortion parameter for the single camera 17A, a description will be given hereinbelow of a case in which the above-mentioned distortion parameter estimation is used for a stereo pair made up of the cameras 17A and 17B.

Figure 6:
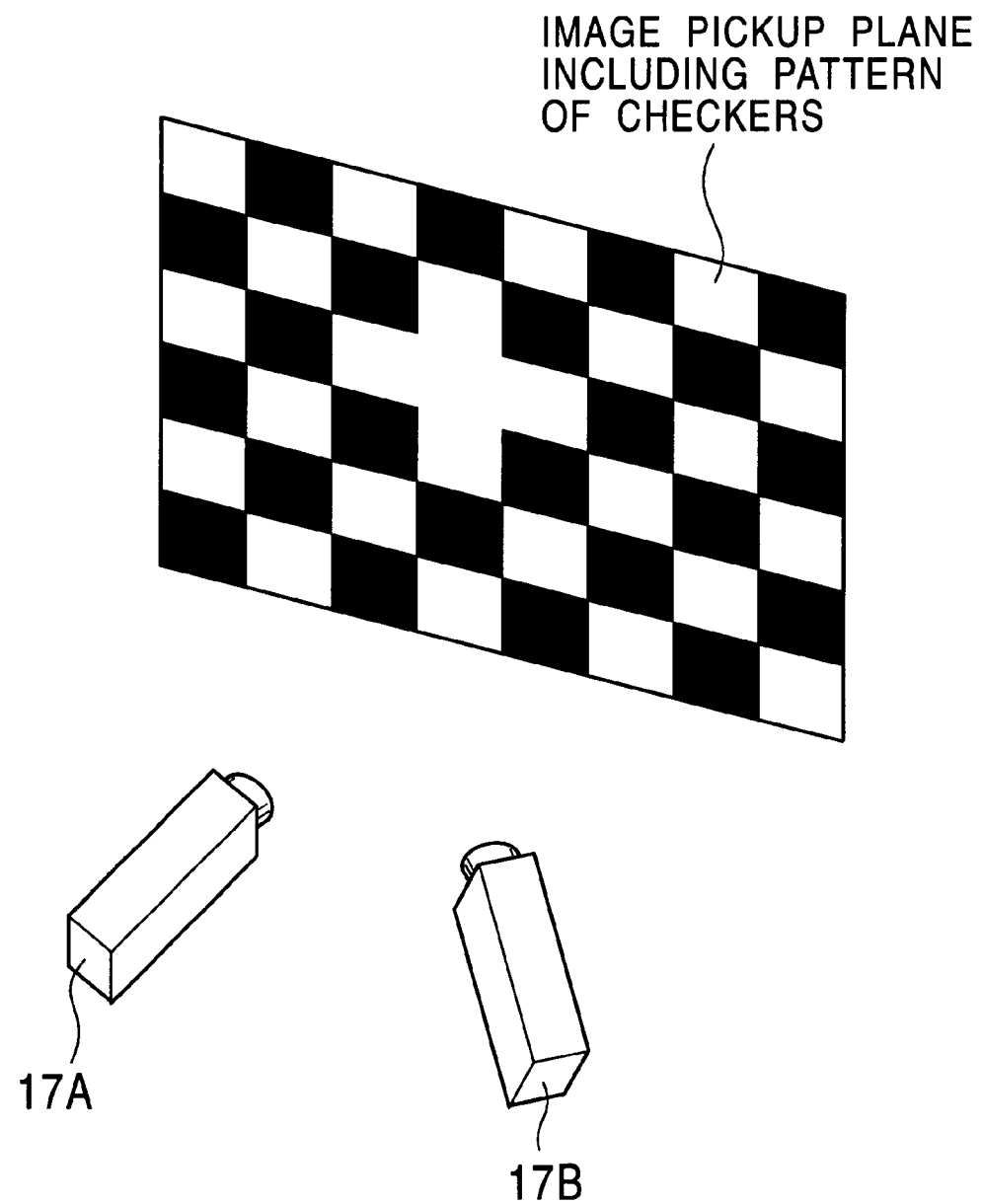
FIG. 6 is an illustration of a state in which a base camera and a reference camera organizing a stereo pair take a photograph of a plane with a binary black-and-white checkers-like texture.

FIG. 6 shows a state in which each of the base camera 17A and the reference camera 17B constituting a stereo pair takes a photograph of a plane with a binary black-and-white checker-like texture. In this case, let it be assumed that the positional relationship between the base camera 17A and the reference camera 17B is in a fixed condition.

Figure 7:
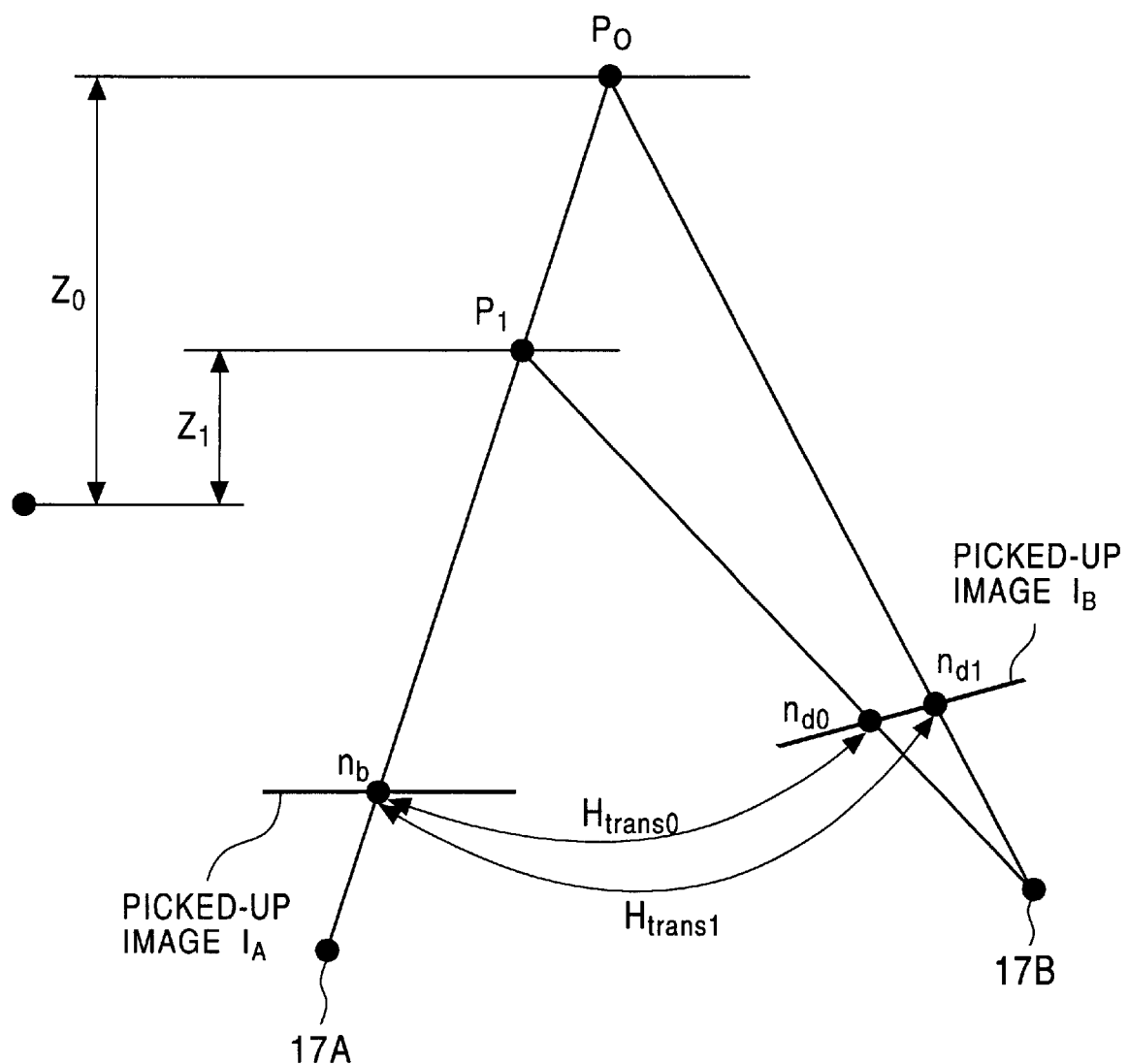
FIG. 7 is an illustration of a state in which the base camera and the reference camera constituting the stereo pair take a photograph of a plane, viewed from above.

FIG. 7 shows a photographing state by the stereo pair, viewed from the above. Let it be assumed that the origin position from which the distance to an image pickup plane is measured lies on this stereo space. When the distance from the origin to the image pickup plane is set at $Z_0$, the intersection $P_0$ between the line of sight of the base camera 17A and the image pickup plane is observed as a point $n_b$ on a picked-up image $I_A$ by the base camera 17A, while it is observed as a point $n_{d0}$ on a picked-up image $I_B$ by the reference camera 17B. Furthermore, when the distance to the image pickup plane is set at $Z_1$, the intersection $P_1$ between the line of sight of the base camera 17A and the image pickup plane appears as the same point $n_b$ on the picked-up image $I_A$ by the base camera 17A, while it appears as another point $n_{d1}$ on the picked-up image $I_B$ by the reference camera 17B.

A projective transformation matrix $H_{trans0}$ to minimize the luminance error for when the picked-up images $I_A$ and $I_B$ are piled up one another can be calculated with the image registration. Likewise, a projective transformation matrix $H_{trans1}$ to minimize the luminance error for when the picked-up images $I_A$ and $I_B$ lie one upon another is also obtainable with the image registration.

Owing to the use of the projective transformation matrix $H_{tran0}$, with respect to an arbitrary point $P_0$ on a plane at a distance $Z_0$, it is possible to calculate a point $n_{d0}$ on the picked-up image $I_B$ corresponding to an observation point $n_b$ on the picked-up image $I_A$. In addition, through the projective transformation matrix $H_{tran1}$, with respect to an arbitrary point $P_1$, on a plane at a distance Z1, it is possible to calculate a point $n_{d1}$ on the picked-up image $I_B$ corresponding to the observation point $n_b$ on the picked-up image $I_A$.

The observation point $n_b$ o f the picked-up image $I_A$ taken by the base camera 17A, when there are image pickup planes at the distances $Z_0$ $_{and\ Z1}$, is observed as the points $n_{d0}$ and $n_{d1}$ on the picked-up image $I_B$ taken by the reference camera 17B. The straight line establishing a connection between these two points $n_{d0}$ and $n_{d1}$, constitutes an epipolar line. A technique whereby a distance-direction interpolation on this epipolar line is made through a photograph of a plane at a different distance is disclosed, for example, in Japanese Patent Application Nos. 9-207948 and 9-207951 already assigned to this applicant.

Figure 8:
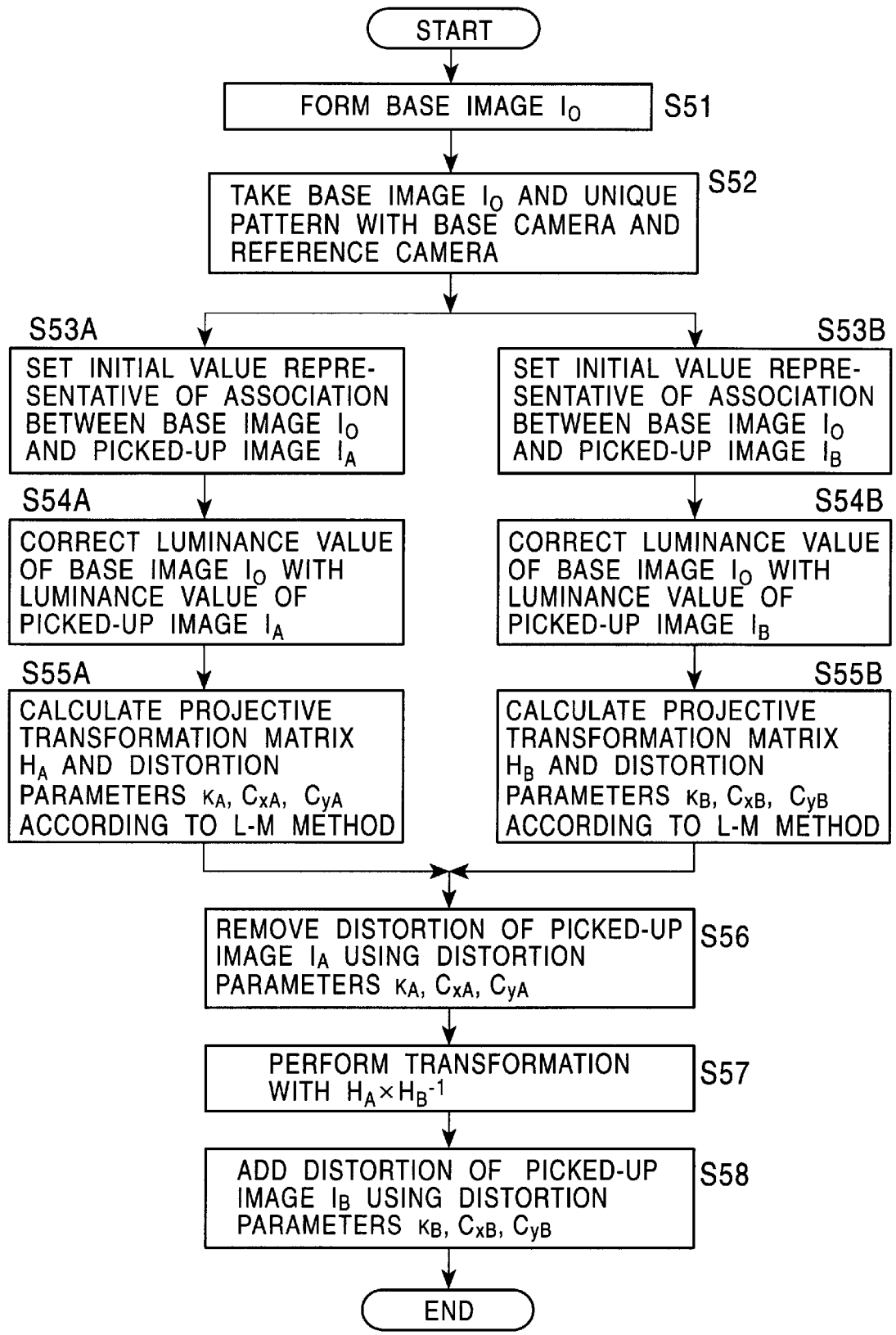
FIG. 8 is a flow chart showing the outline of a processing procedure for distortion parameter estimation with respect to the stereo pair.

The realization of the distance measurement according to the stereo-method is on the premise of the acquisition of the projective transformation matrixes $H_{trans0}$ and $H_{trans1}$ between the base camera 17A and the reference camera 17B. These projective transformation matrixes are attainable through the above-mentioned distortion parameter estimation. FIG. 8 is a flow chart showing a processing procedure therefor. A description thereof will be given hereinbelow with reference to this flow chart.

First of all, the arithmetic processing section 11 composes a calibration pattern on the basis of a definition of a geometrical configuration, and puts this composed image in the frame memory 14 as a base image $I_0$ (step S51).

Furthermore, a plane having a pattern is photographed by the base camera 17A and the reference camera 17B. Density-varying images $I_A$ and $I_B$ taken by the cameras 17A and 17B are temporarily put in the frame memory 19 (step S52). The pattern formed on the plane is a calibration pattern for use in calibration, and the geometrical configuration thereof is univocal with respect to the definition of the base image $I_0$. Additionally, this pattern is not required to be formed on a plane by printing or the like. For example, it is also acceptable to form the pattern by projecting a base image existing on the frame memory 14, for example, through the use of the light projector 22.

For the calibration pattern, if the geometrical configuration is known in advance, no particular limitation is imposed on pattern configuration, pattern dimension and pattern color. A combination of simple basic figures easy to compose in the system 10 is useful (see the above description).

Figure 9:
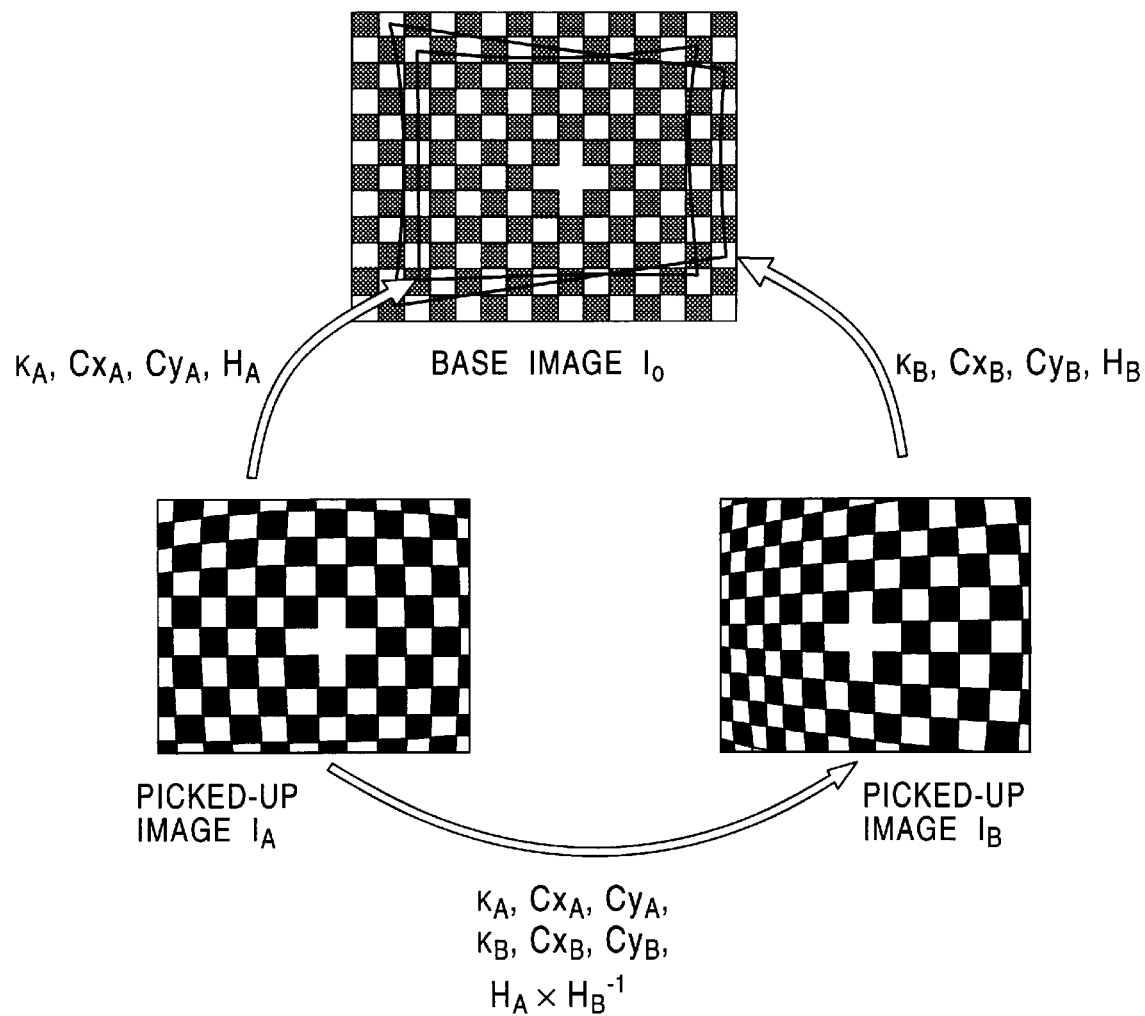
FIG. 9 is an illustration of a state in which picked-up images taken by the base camera and the reference camera are registered to a composed base image.
Figure 10:
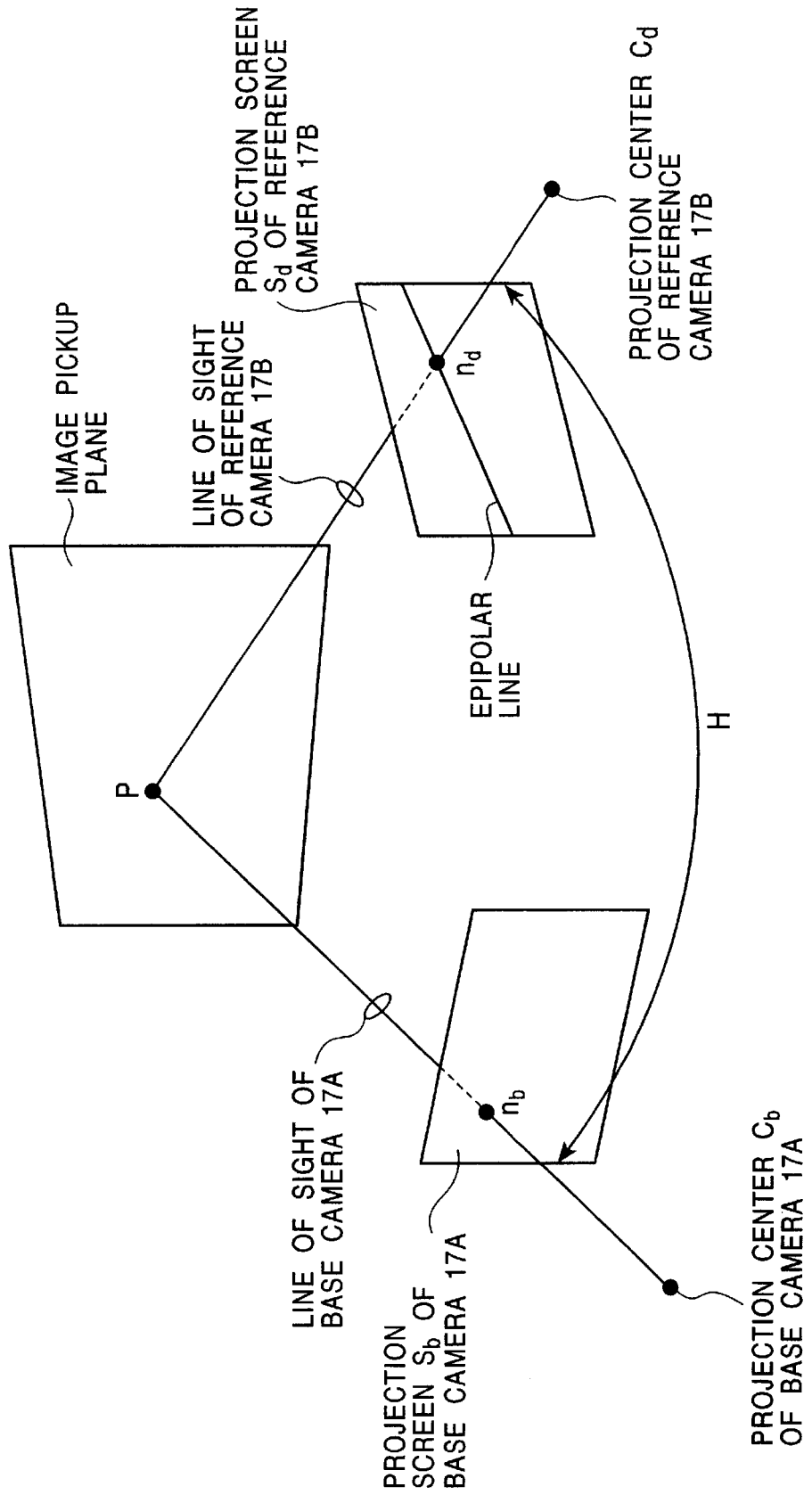
FIG. 10 illustratively shows locations of the base camera and the reference camera with respect to a subject.
Figure 11:
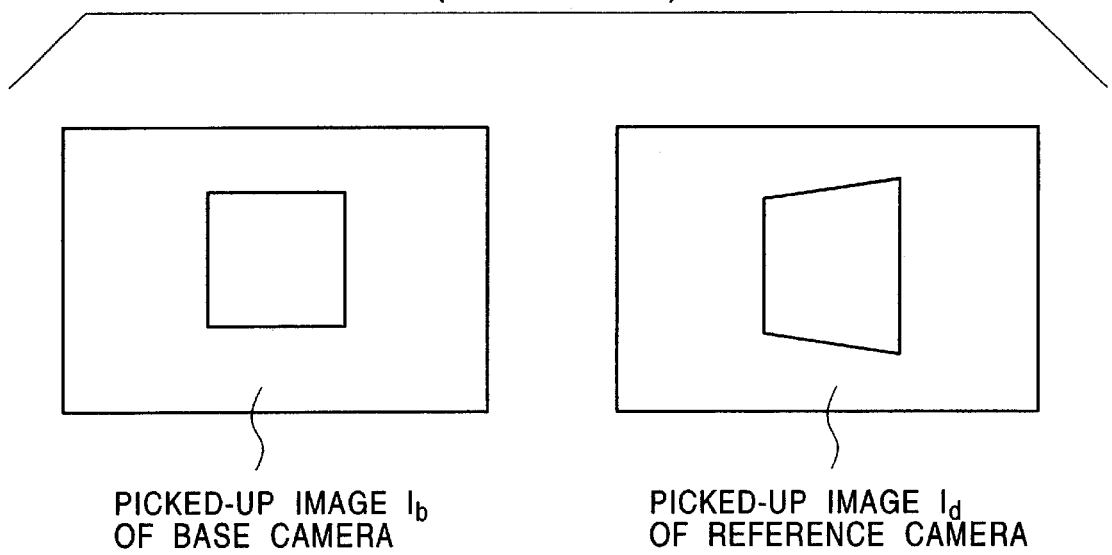
FIG. 11 is an illustration of images of a generally square pattern picked up by the base camera and the reference camera.
Figure 12:
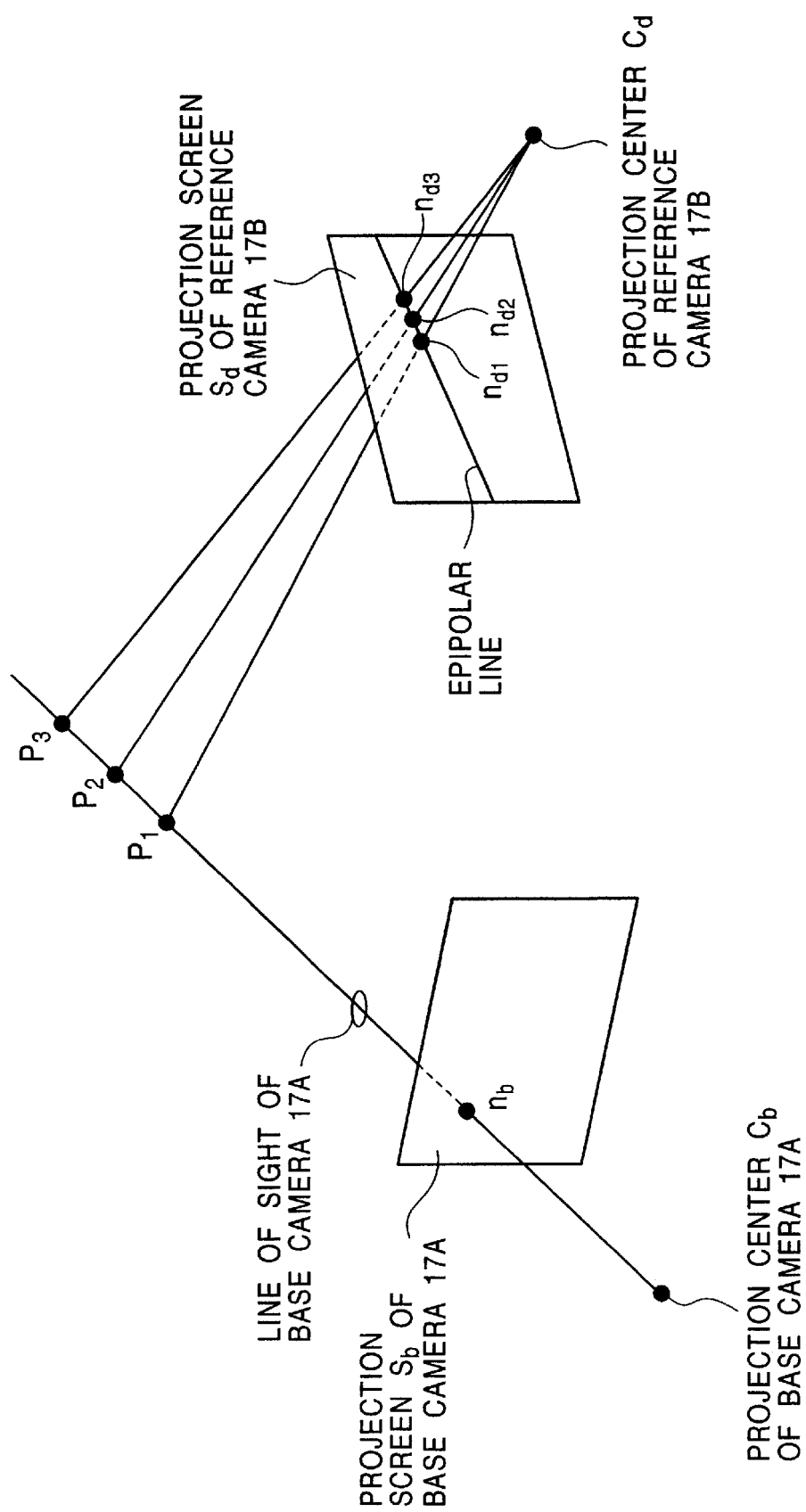
FIG. 12 is an illustration of a state of an epipolar line and an observation point in a reference image.

Here, a plane with a binary black-and-white checker texture shown in FIG. 9 is used as the calibration pattern. There is no limit to the distance from this plane equipped with the texture to each of the cameras 17A and 17B.

Following this, the operational flow advances to setting an initial value of the association between a base image $I_0$ and a picked-up image $I_A$ (step S53A). This association is described with a projective transformation matrix $H_A$. However, at this time, only the correspondence between the two images can be set without taking the lens distortion of the camera 17A into consideration. For the initial value, there is no need to particularly limit the way of setting as long as the setting of four or more corresponding points is feasible.

Furthermore, the operational flow proceeds to correcting the luminance value of the base image $I_0$ on the basis of the luminance value of the picked-up image $I_A$ in order to secure high-efficiency high-accuracy image registration (step S54A).

Still furthermore, the operational flow goes to performing the image registration according to the L-M method for calculating the projective transformation matrix $H_A$ and distortion parameters $\kappa_A$, $C_{xA}$ and $C_{yA}$ (step S55A), where $\kappa_A$ designates a lens distortion coefficient of the camera 17A. In this case, the point indicated by ($C_{xA}$ and $C_{yA}$) is the lens distortion center. FIG. 9 shows a state of the image registration. For the details of the L-M method, refer to the above description.

Likewise, with respect to the picked-up image $I_B$ taken by the other camera 17A, are made the setting of an initial value of the association with the base image $I_0$ (step S53B), the correction of the luminance value of the base image $I_0$ on the basis of the luminance value of the picked-up image $I_B$ (step S54B), the calculation of a projective transformation matrix $H_B$ and distortion parameters $\kappa_B$, $C_{xB}$ and $C_{yB}$ (step S55B).

A projective transformation matrix $H_{trans}$ from the picked-up image $I_A$ by the base camera 17A to the picked-up image $I_B$ by the reference camera 17B can be expressed in the form of $H_A \times H^{-1}_B$ (step S57). Before or after this projective transformation processing, the distortion is removed from the picked-up image $I_A$ using the distortion parameters $\kappa_A$, $C_{xA}$ and $C_{yA}$ (step S56), while a distortion equivalent to the picked-up image $I_B$ is added thereto using the distortion parameters $\kappa_B$, $C_{xB}$ and $C_{yB}$ (step S58).

In the image registration, there is a need to make the images coincident in coordinate system with each other (that is, a need exists in that the corresponding squares in the picked-up images $I_A$ and $I_B$ taken by the cameras 17A and 17B are registered to the same square of the base image $I_0$). Accordingly, it is also appropriate that a special pattern is formed at one portion (or a plurality of portions) of the calibration pattern to arrange a match between the images. For example, FIG. 9 shows, it is also appropriate to remove one black square from the checker texture.

As described above in detail, according to this invention, there is provided a high-performance camera calibration method and apparatus capable of accomplishing stable and high-accuracy parameter estimation for a camera which is of a type taking a photograph of a subject to electronic image data.

In addition, according to the invention, there is a provided a high-performance camera calibration method and apparatus capable of achieving stable and high-accuracy parameter estimation through the use of one picked-up image.

In the invention, camera parameter calculation, i.e., calibration, is made by registering a pattern composed in a computer, i.e., a base image, to a picked-up image actually taken by a camera. In other words, the parameter calculation can be made by minimizing the luminance error between both the images.

According to the invention, since the processing can be conducted without using local characteristic points, the parameter estimation does not receive the influence of an error or the like generated at the extraction of the characteristic points, and the effect of a noise of an image picked up by a camera is suppressible. Additionally, stable parameter calculation is feasible with one picked up image.

Furthermore, a combination of simple figures (for example, binary black-and-white checkers or a combination of binary triangles) easy to generate in a computer functions sufficiently as a pattern for calibration. Although a photograph of such a pattern requires a plane having a pattern identical to the composed pattern, since there is no need to equalize the distance to a camera or the size of the pattern, the condition of the calibration is reducible. Additionally, the calibration is also achievable by taking a photograph of an image obtained by projecting a pattern on a plain plane through the use of a slide or the like.

Still furthermore, since a pattern known in advance, that is, predefined, is employed for the calibration, it is easy to construct a preprocessing algorithm, for example, for luminance correction. Alternatively, it is possible to perform the calibration through the use of a pattern which allows easy construction of the preprocessing algorithm.

Moreover, since it is possible to calculate a projective transformation matrix representative of the correspondence between a composed image and a picked-up image simultaneously with calculating distortion parameters, the present invention is also applicable to a calibration for the stereo-method. That is, the association between two picked-up images given by cameras is obtainable by performing a coordinate transformation with a projective transformation for associating one picked-up image with a base image and an inverse transformation of a projective transformation for associating the other picked-up image with the base image.

For example, Japanese Patent Application No. 9-207948 or 9-207951 already assigned to this applicant discloses an image processing apparatus and method according to the stereo-method, and the present invention is also applicable to the image processing apparatus and method, and others.

Although the details of the present invention have been described above with reference to a specific embodiment, it will be obvious to those skilled in the art that various changes and modifications may be made without departing from the scope and spirit of the invention.

Although, in the above description, this embodiment is based upon the transformation from a picked-up image to a base image, the invention is not limited to this, but even inverse transformation also enables the calculation of parameters in the invention.

That is, the present invention has been disclosed in the illustrated form, and it is our intention that the scope of the invention be not limited by the description, but be defined by the accompanying claims.

What is claimed is:

1. A camera calibration apparatus for calculating a parameter representative of a characteristic of a camera, comprising:

image inputting means for inputting a picked-up image obtained by taking a photograph of a pattern with a predefined geometrical configuration through the use of a camera;

image holding means for holding a base image comprising said pattern with said predefined geometrical configuration; and transformation parameter calculating means for calculating a transformation parameter on the basis of the association in pixel between said picked-up image and said base image to minimize luminance error between corresponding pixels of both said picked-up image and base image.

2. A camera calibration apparatus according to claim 1, further comprising image generating means for generating said base image comprising said pattern with said predefined geometrical configuration according to the definition, with said image holding means holding said image generated by said image generating means.

3. A camera calibration apparatus according to claim 1, further comprising image generating means for generating said base image comprising said pattern with said predefined geometrical configuration according to the definition and light projecting means for projecting the generated base image on a generally plain plane, with said image inputting means inputting a picked-up image obtained by photographing the projected image, given by said light projecting means, through the use of said camera.

4. A camera calibration apparatus according to claim 1, wherein said transformation parameter calculating means performs an image conversion of one of said picked-up image and said base image and further associates the converted image with the other image.

5. A camera calibration apparatus according to claim 4, wherein said transformation parameter calculating means derives a projective transformation parameter, performs an image conversion of one of said picked-up image and said base image through the use of the derived projective transformation parameter.

6. A camera calibration apparatus according to claim 5, wherein said transformation parameter calculating means derives a distortion parameter representative of a distortion factor of a picked-up image taking place at image pickup by said camera and performs a projective transformation of said picked-up image from which distortion is removed through the use of the derived distortion parameter, to associate the transformed image with said base image.

7. A camera calibration apparatus according to claim 4, wherein said transformation parameter calculating means derives a distortion parameter representative of a distortion factor of a picked-up image taking place at image pickup by said camera and performs an image conversion of one of said picked-up image and said base image through the use of the derived distortion parameter, and associates the converted image with the other image to minimize a luminance error between corresponding pixels of both said images.

8. A camera calibration apparatus according to claim 1, wherein said transformation parameter calculating means corrects a luminance value of said base image in accordance with a luminance value of said picked-up image.

9. A camera calibration apparatus according to claim 8, wherein said transformation parameter calculating means extracts, from said picked-up image, an area in which luminance values are approximately equal to each other, and obtains an average value of said luminance values in the extracted area to replace a luminance value of the corresponding pixel in said base image with the obtained average value for correction.

10. A camera calibration method of calculating a parameter representative of a characteristic of a camera, comprising:

an image inputting step of inputting a picked-up image obtained by taking a photograph of a pattern with a predefined geometrical configuration through the use of a camera;

an image holding step of holding a base image comprising said pattern with said predefined geometrical configuration; and a transformation parameter calculating step of calculating a transformation parameter on the basis of the association in pixel between said picked-up image and said base image to minimize luminance error between corresponding pixels of both said picked-up image and base image.

11. A camera calibration method according to claim 10, further comprising an image generating step of generating said base image comprising said pattern with said predefined geometrical configuration according to the definition, with said image holding step holding said image generated by said image generating step.

12. A camera calibration method according to claim 10, further comprising an image generating step of generating said base image comprising said pattern with said predefined geometrical configuration according to the definition and a light projecting step of projecting the generated base image on a generally plain plane, with said image inputting step inputting a picked-up image obtained by photographing the projected image, given by said light projecting step, through the use of said camera.

13. A camera calibration method according to claim 10, wherein said transformation parameter calculating step performs an image conversion of one of said picked-up image and said base image and further associates the converted image with the other image.

14. A camera calibration method according to claim 13, wherein said transformation parameter calculating step derives a projective transformation parameter, performs an image conversion of one of said picked-up image and said base image through the use of the derived projective transformation parameter, and associates the converted image with the other image to minimize a luminance error between corresponding pixels of both said images over the whole of said images.

15. A camera calibration method according to claim 14, wherein said transformation parameter calculating step derives a distortion parameter representative of a distortion factor of a picked-up image taking place at image pickup by said camera and performs a projective transformation of said picked-up image from which distortion is removed through the use of the derived distortion parameter, to associate the transformed image with said base image.

16. A camera calibration method according to claim 13, wherein said transformation parameter calculating means derives a distortion parameter representative of a distortion factor of a picked-up image taking place at image pickup by said camera and performs an image conversion of one of said picked-up image and said base image through the use of the derived distortion parameter, and associates the converted image with the other image to minimize a luminance error between corresponding pixels of both said images.

17. A camera calibration method according to claim 10, wherein said transformation parameter calculating step corrects a luminance value of said base image in accordance with a luminance value of said picked-up image.

18. A camera calibration method according to claim 17, wherein said transformation parameter calculating step extracts, from said picked-up image, an area in which luminance values are approximately equal to each other, and obtains an average value of said luminance values in the extracted area to replace a luminance value of the corresponding pixel in said base image with the obtained average value for correction.

19. An image processing apparatus for processing a plurality of images picked up by a camera, comprising:
- image inputting means for inputting a picked-up image obtained by taking a photograph of a pattern with a predefined geometrical configuration through the use of a camera;
- image holding means for holding a base image comprising said pattern with said predefined geometrical configuration;
- transformation parameter calculating means for calculating a transformation parameter on the basis of the association in pixel between said picked-up image and said base image to minimize luminance error between corresponding pixels of both said picked-up image and base image; and
- arithmetic means for obtaining the association in pixel among a plurality of picked-up images obtained by said camera through the use of the calculated transformation parameter.

20. An image processing apparatus according to claim 19, further comprising image generating means for generating said base image comprising said pattern with said predefined geometrical configuration according to the definition, with said image holding means holding said image generated by said image generating means.

21. An image processing apparatus according to claim 19, further comprising image generating means for generating said base image comprising said pattern with said predefined geometrical configuration according to the definition and light projecting means for projecting the generated base image on a generally plain plane, with said image inputting means inputting a picked-up image obtained by photographing the projected image, given by said light projecting means, through the use of a camera.

22. An image processing apparatus according to claim 19, wherein said transformation parameter calculating means performs an image conversion of one of said picked-up image and said base image and further associates the converted image with the other image.

23. An image processing apparatus according to claim 22, wherein said transformation parameter calculating means derives a projective transformation parameter, performs an image conversion of one of said picked-up image and said base image through the use of the derived projective transformation parameter, and associates the converted image with the other image to minimize a luminance error between corresponding pixels of both said images over the whole of said images.

24. An image processing apparatus according to claim 23, wherein said arithmetic means performs, for the association between two picked-up images obtained by said camera, a coordinate transformation using a projective transformation for associating one of said two picked-up images with said base image and an inverse transformation of a projective transformation for associating the other picked-up image with said base image.

25. An image processing apparatus according to claim 24, wherein said transformation parameter calculating means derives a distortion parameter representative of a distortion factor of said picked-up images taking place at image pickup by said camera and performs a projective transformation of said picked-up image, from which distortion is removed through the use of said distortion parameter, to associate the transformed image with said base image.

26. An image processing apparatus according to claim 22, wherein said transformation parameter calculating means derives a distortion parameter representative of a distortion factor of a picked-up image taking place at image pickup by said camera and performs an image conversion of one of said picked-up image and said base image through the use of the derived distortion parameter, and associates the converted image with the other image to minimize a luminance error between corresponding pixels of both said images.

27. An image processing apparatus according to claim 19, wherein said transformation parameter calculating means corrects a luminance value of said base image in accordance with a luminance values of said picked-up images.

28. An image processing apparatus according to claim 27, wherein said transformation parameter calculating means extracts, from said picked-up images, an area in which luminance values are approximately equal to each other and obtains an average value of said luminance values in the extracted area to replace a luminance value of a corresponding pixel in said base image with said average value.

29. An image processing apparatus according to claim 19, wherein said image inputting means inputs a plurality of picked-up images obtained by a plurality of cameras standing in a predetermined positional relationship.

30. An image processing method of processing a plurality of images picked up by a camera, comprising:
- an image inputting step of inputting a picked-up image obtained by taking a photograph of a pattern with a predefined geometrical configuration through the use of a camera;
- an image holding step of holding a base image comprising said pattern with said predefined geometrical configuration;
- transformation parameter calculating step of calculating a transformation parameter on the basis of the association in pixel between said picked-up image and said base image to minimize luminance error between corresponding pixels of both said picked-up image and base image; and
- an arithmetic step of obtaining the association in pixel among a plurality of picked-up images obtained by said camera through the use of the calculated transformation parameter.

31. An image processing method according to claim 30, further comprising an image generating step of generating said base image comprising said pattern with said predefined geometrical configuration according to the definition, with said image holding step holding said image generated by said image generating step.

32. An image processing method according to claim 30, further comprising an image generating step of generating said base image comprising said pattern with said predefined geometrical configuration according to the definition and a light projecting step of projecting the generated base image on a generally plain plane, with said image inputting step inputting a picked-up image obtained by photographing the projected image, given by said light projecting step, through the use of a camera.

33. An image processing method according to claim 30, wherein said transformation parameter calculating step performs an image conversion of one of said picked-up image and said base image and further associates the converted image with the other image.

34. An image processing method according to claim 33, wherein said transformation parameter calculating step derives a projective transformation parameter, performs an image conversion of one of said picked-up image and said base image through the use of the derived projective transformation parameter, and associates the converted image with the other image to minimize a luminance error between corresponding pixels of both said images over the whole of said images.

35. An image processing method according to claim 34, wherein said arithmetic step performs, for the association between two picked-up images obtained by said camera, a coordinate transformation using a projective transformation for associating one of said two picked-up images with said base image and an inverse transformation of a projective transformation for associating the other picked-up image with said base image.

36. An image processing method according to claim 35, wherein said transformation parameter calculating step derives a distortion parameter representative of a distortion factor of said picked-up images taking place at image pickup by said camera and performs a projective transformation of said picked-up image, from which distortion is removed through the use of said distortion parameter, to associate the transformed image with said base image.

37. An image processing method according to claim 30, wherein said transformation parameter calculating step corrects a luminance value of said base image in accordance with a luminance values of said picked-up images.

38. An image processing method according to claim 37, wherein said transformation parameter calculating step extracts, from said picked-up images, an area in which luminance values are approximately equal to each other and obtains an average value of said luminance values in the extracted area to replace a luminance value of a corresponding pixel in said base image with said average value.

39. An image processing method according to claim 30, wherein said image inputting step inputs a plurality of picked-up images obtained by a plurality of cameras standing in a predetermined positional relationship.

40. A computer-readable program providing medium for providing, in a material computer-readable form, a computer program for implementing, on a computer system, a camera calibration to calculate a parameter representative of a characteristic of a camera, said computer program comprising:

an image inputting step of inputting a picked-up image obtained by taking a photograph of a pattern with a predefined geometrical configuration through the use of a camera;

an image holding step of holding a base image comprising said pattern with said predefined geometrical configuration; and a transformation parameter calculating step of calculating a transformation parameter on the basis of the association in pixel between said picked-up image and said base image to minimize luminance error between corresponding pixels of both said picked-up image and base image.

41. A camera which conducts a camera calibration, said camera comprising:

image inputting means for inputting a picked-up image;

an image holding means for holding a base image comprising a pattern with a predefined geometrical configuration; and transformation parameter calculating means for calculating a transformation parameter on the basis of the association in pixel between said picked-up image and base image to minimize luminance error between corresponding pixels of both said picked-up image and base image, wherein said picked-up image, has a pattern with said predefined geometrical configuration, and is inputted through the image inputting means and said base image.

\* \* \* \* \*